(12) United States Patent
Bäse et al.

(10) Patent No.: US 9,213,738 B2
(45) Date of Patent: Dec. 15, 2015

(54) METHOD AND DEVICE FOR GENERATING AN RDF DATABASE FOR AN RDF DATABASE QUERY AND A SEARCH METHOD AND A SEARCH DEVICE FOR THE RDF DATABASE QUERY

(75) Inventors: Gero Bäse, München (DE); Mario Döller, Pocking (DE); Florian Markus Stegmaier, Passau (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 817 days.

(21) Appl. No.: 13/264,676

(22) PCT Filed: Mar. 23, 2010

(86) PCT No.: PCT/EP2010/053752
§ 371 (c)(1),
(2), (4) Date: Oct. 14, 2011

(87) PCT Pub. No.: WO2010/118931
PCT Pub. Date: Oct. 21, 2010

(65) Prior Publication Data
US 2012/0041974 A1      Feb. 16, 2012

(30) Foreign Application Priority Data
Apr. 15, 2009   (DE) .......................... 10 2009 017 082

(51) Int. Cl.
*G06F 17/30*       (2006.01)

(52) U.S. Cl.
CPC .... *G06F 17/30421* (2013.01); *G06F 17/30958* (2013.01)

(58) Field of Classification Search
CPC .................... G06F 17/30864; G06F 17/30867
USPC .......... 707/1/1, 769, 718, 713, 723, 798, 760, 707/752, 797; 715/210, 700; 382/199, 170
See application file for complete search history.

(56) References Cited

U.S. PATENT DOCUMENTS 7,702,725 B2 *   4/2010   Erickson et al. ............... 709/203
7,890,518 B2 *   2/2011   Aasman ........................ 707/752
(Continued)

OTHER PUBLICATIONS

"Resource Description Framework"; printed from Wikipedia on Apr. 15, 2009; pp. 1-8.
(Continued)

*Primary Examiner* — Mariela Reyes
*Assistant Examiner* — Thong Vu
(74) *Attorney, Agent, or Firm* — Staas & Halsey LLP

(57) ABSTRACT

Information values are created by nodes and directed edges describing dependencies between two nodes or information values, respectively, in the form of a directed graph for a database query. By using a path distance describing a number of directed edges between a selected node and a target tuple, formed of two nodes connected to a directed edge and a associated directed edge, a reduction of a complexity of a database query and thus an acceleration of the database query can be achieved. The search method can be used, for example, for monitoring systems or in medical databases. Furthermore, the search method can be used for databases which are dynamically extended, for example by new events in the monitoring system.

14 Claims, 4 Drawing Sheets

(56) References Cited

U.S. PATENT DOCUMENTS

| | | |
|---|---|---|
| 8,244,772 B2 * | 8/2012 | Aasman et al. ............... 707/797 |
| 2002/0059566 A1 * | 5/2002 | Delcambre et al. ............ 717/146 |
| 2002/0174087 A1 * | 11/2002 | Hao et al. ............................ 707/1 |
| 2003/0118244 A1 * | 6/2003 | Effros et al. .................. 382/251 |
| 2010/0241644 A1 * | 9/2010 | Jackson et al. ................ 707/760 |
| 2014/0304251 A1 * | 10/2014 | Bornea et al. ................. 707/718 |

OTHER PUBLICATIONS

"Web Ontology Language"; printed from Wikipedia on Apr. 15, 2009; pp. 1-4.

"SPARQL"; printed from Wikipedia on Apr. 15, 2009; pp. 1-2.

G. Barla-Szabo et al.; "Taxonomy of directed graph representations"; IEE Proceedings Software; vol. 151, No. 6, Dec. 2004; pp. 257-264.

"Depth-limited search"; printed from Wikipedia on Aug. 19, 2009; pp. 1-2.

K.J. Kochut et al.; "SPARQLeR: Extended Sparql for Semantic Association Discovery"; The Semantic Web: Research and Applications, Lecture Notes in Computer Science; Springer-Verlag; 2007; pp. 145-159.

International Search Report for Application No. PCT/EP2010/053752; mailed May 25, 2010.

M. Janik et al., "Brahms: A WorkBench RDF Store and High Performance Memory System for Semantic Association Discovery",; The Semantic WEB—ISWC 2005, Lecture Notes in Computer Science; Springer-Verlag; 2005; pp. 431-445.

R. Angles et al.; "Querying RDF Data from a Graph Database Perspective"; The Semantic Web: Research and Applications; Lectures Notes in Computer Science; Springer-Verlag; 2005; pp. 346-360.

K. Anyanwu et al.; "p-Queries: Enabling Querying for Semantic Associations on the Semantic Web"; Proceedings of the 12th International Conference on World Wide Web; Budapest, Hungary; Jan. 2003; pp. 690-699.

F. Alkhateeb et al.; "Extending SPARQL with regular expression patterns (for querying RDF)"; Web Semantics: Science, Services and Agents on the World Wide Web; vol. 7, No. 2; 2009; pp. 57-73.

R.H. Gueting; "GraphDB: Modeling and Querying Graphs in Databases"; Proceedings of the 20th International Conference on Very Large Data Bases (20th VLDB Conference); Sep. 1994, Santiago, Chile; pp. 297-308.

T. Furche et al.; "RDF Querying: Language Construct and Evaluation Methods Compared"; Reasoning Web, Lecture Notes in Computer Science; Springer-Verlag; 2006; pp. 1-52.

* cited by examiner

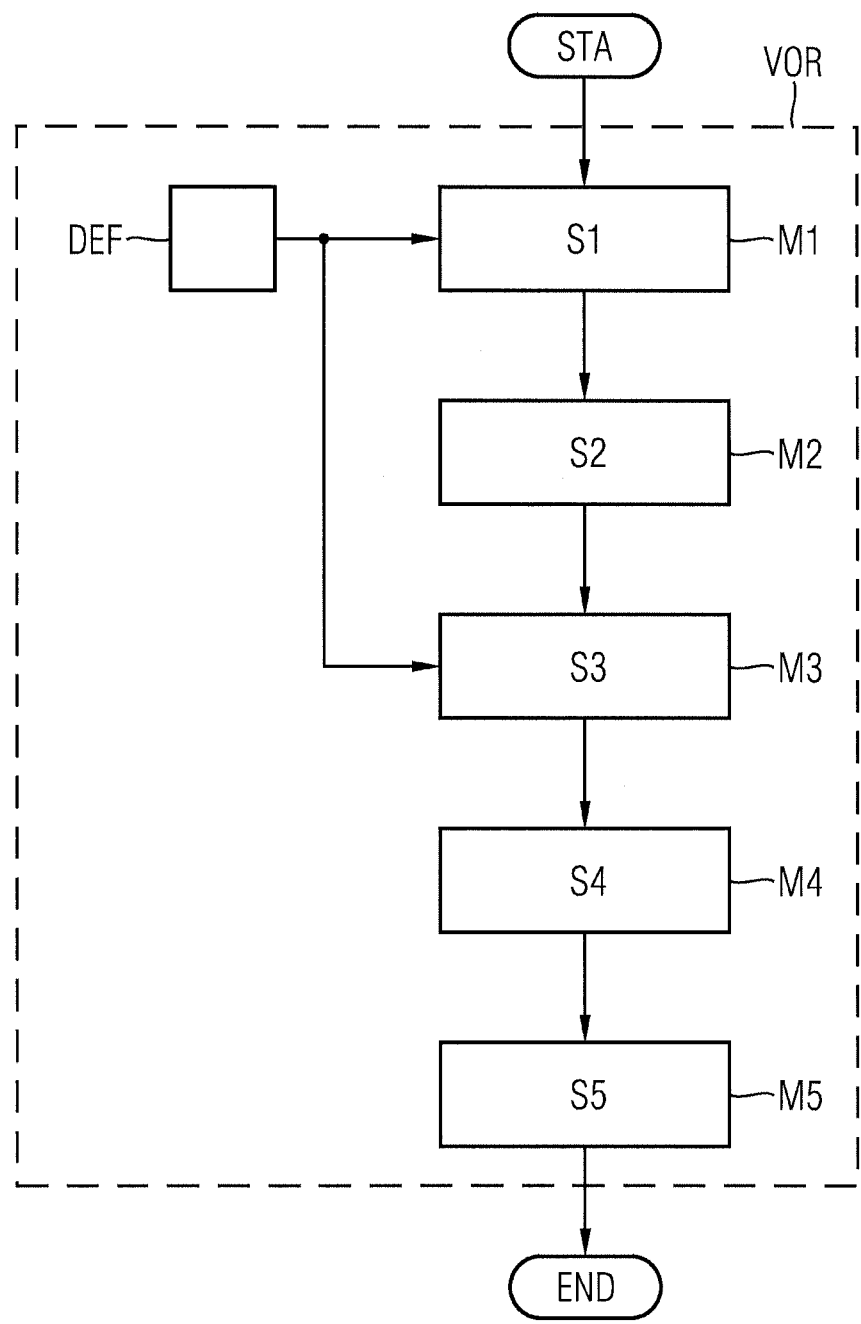

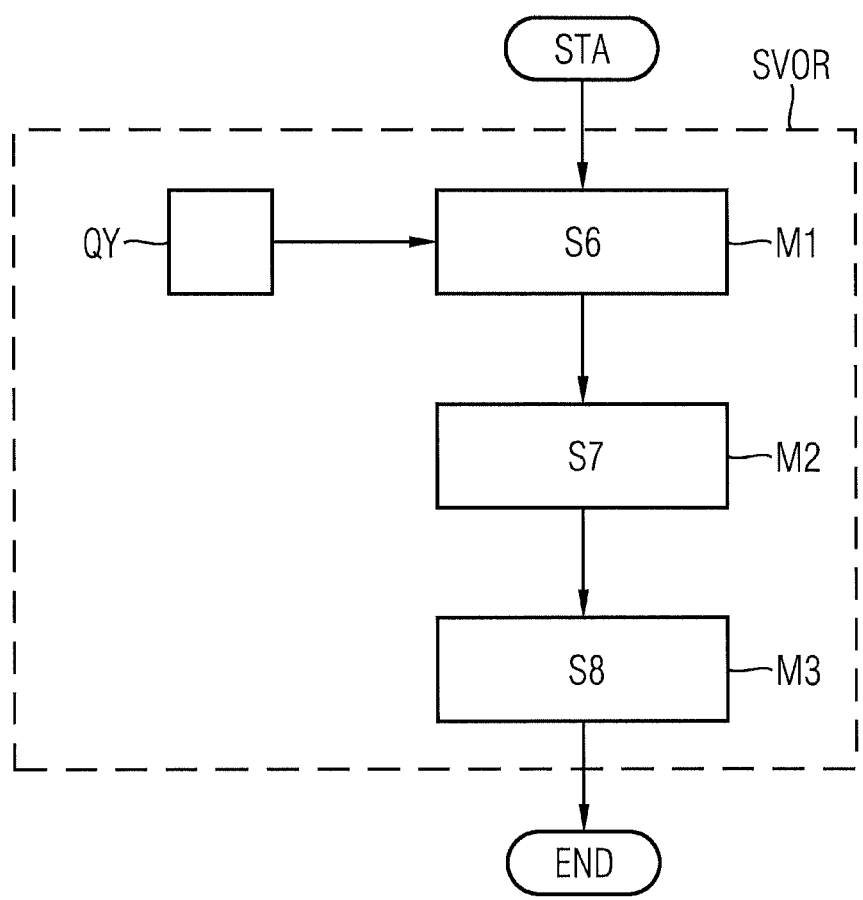

METHOD AND DEVICE FOR GENERATING AN RDF DATABASE FOR AN RDF DATABASE QUERY AND A SEARCH METHOD AND A SEARCH DEVICE FOR THE RDF DATABASE QUERY

CROSS REFERENCE TO RELATED APPLICATIONS

This application is the U.S. national stage of International Application No. PCT/EP2010/053752, filed Mar. 23, 2010 and claims the benefit thereof. The International Application claims the benefits of German Application No. 102009017082.0 filed on Apr. 15, 2009, both applications are incorporated by reference herein in their entirety.

BACKGROUND

Described below are a method and device for generating a database for a database query, and a search method and search device for querying a database.

Information values such as flight data or stock exchange prices are today made available to a user by databases. There are for that purpose a multiplicity of database languages by which the respective database can be described and queried in a structured manner. One way is to use RDF/OWL (RDF: Resource Description Framework; OWL: Web Ontology Language, as described, for example, in Wikipedia on Apr. 15, 2009) which is a representative example of describing databases by semantic relationships. Information values in the form of nodes are described therein, two nodes and a directed edge between the two nodes being designated in each case as an RDF triple. The two nodes therein represent a subject and an object and the directed edge represents a predicate. The predicate therein generally defines a semantic relationship between the subject and object. This will be explained in more detail with the aid of an example according to FIG. 1. The node B therein represents the subject "Person", the node A the object "Mario", and the directed edge a the predicate "has name". The RDF triple "BaA" is thus read as "Person has name Mario". Chaining RDF triples of such kind will produce a graph structure constituting a directed graph; see FIG. 1 for example. Triples have a bold frame in FIG. 1.

A query language SPARQL (SPARQL: SPARQL Protocol and RDF Query Language, as described, for example, in Wikipedia on Apr. 15, 2009) can serve for querying an information value of the database according to RDF/OWL. One or more RDF triples of the database are searched for that purpose starting from a predefinable node, meaning from a specific information value; see in FIG. 1, for example, the RDF triples with a bold frame (BaA, HjJ, IkK). For querying the RDF triples, meaning for a semantic query, a searched subgraph is realized by indicating all RDF triples that are involved. To indicate the aforementioned three RDF triples it is hence necessary to specify chains of RDF triples that include the RDF triples framed in FIG. 2. This is a process that makes a semantic database query complex and time-consuming because extensive knowledge of the structure of the database is necessary even when the database query is submitted.

SUMMARY

It is hence desirable to develop a method and device for generating a database for a database query, and a search method and search device for querying a database, both of which will enable the complexity associated with the database query to be reduced.

Described below is a method for generating a database for making information values available by nodes and for making dependencies of the information values available by directed edges for a database query, the database being formed by the nodes and directed edges in the form of a directed graph, wherein the following operations are performed:

reading in a description rule indicating the assignment of in each case two information values having the associated dependency;

creating the respective node for the respective information value as well as the respective directed edge for the respective dependency;

generating the directed graph starting from a predefinable node from among the nodes, based on the description rule, two of the nodes and the directed edge linking the respective nodes being characterized in each case as a triple;

determining at least one path from the predefinable node to a triple requiring to be determined in the database query;

generating a respective path distance of the respective path, the respective path distance indicating a number of directed edges from the predefinable node to the triple requiring to be determined, its being possible for the respective path distance to be evaluated during the database query starting from the predefinable node.

What is achieved by the method is to reduce the computational overhead required in the search for specific triples because a reduction in the nodes having to be examined is achieved by indicating the path distance.

Also described below is a device for generating a database for making information values available by nodes and for making dependencies of the information values available by directed edges for a database query, the database being formed by the nodes and directed edges in the form of a directed graph, wherein the device includes components for reading in a description rule indicating the assignment of in each case two information values having the associated dependency;

creating the respective node for the respective information value as well as the respective directed edge for the respective dependency;

generating the directed graph starting from a predefinable node from among the nodes, based on the description rule, two of the nodes and the directed edge linking the respective nodes being characterized in each case as a triple;

determining at least one path from the predefinable node to a triple requiring to be determined in the database query; and generating a respective path distance of the respective path, the respective path distance indicating a number of directed edges from the predefinable node to the triple requiring to be determined, its being possible for the respective path distance to be evaluated during the database query starting from the predefinable node.

The method for generating a database can be implemented with the aid of the device.

Also described below is a search method for determining an information value in a database, its being possible for the database to be generated according to a method for generating a database during which the following operations are performed:

generating a database query by a search pattern that includes an indication of the predefinable node, the path distance, and the triple requiring to be determined;

searching the database for determining the database query, the path distance indicated in the search pattern being taken into account during the search; and making available at least one of the information values of at least one of the triples that meets the specifications of the search pattern.

What is achieved by the method is to reduce the computational overhead required in the search for specific triples in the database because a reduction in the nodes having to be examined is achieved by indicating the path distance.

In a development of the search method the triples having a path distance not exceeding the path distance, indicated in the search pattern, from the node predefined in the search pattern are taken into account during the database search for determining the database query. A further reduction in the computational overhead required for performing the database query can be achieved thereby because a number of triples to be taken into account for the search will be further reduced.

Moreover, the computational overhead required for performing the database query can be even further reduced if the triples having a path distance that is exactly the path distance from the node predefined in the search pattern are taken into account during the database search for determining the database query.

In an advantageous development of the search method a value zero for the path distance in the search pattern is processed in such a way that the path distance will be set to at least a maximum path distance occurring in the database. This will enable a full search of all the nodes and triples in the database irrespective of the maximum path distance occurring.

Finally, described below is a search device for determining an information value in a database, the database having been generated according to the device for generating a database having the following units:

A first unit for generating a database query by a search pattern that includes an indication of the predefinable node, path distance, and triple requiring to be determined;

A second unit for searching the database for determining the database query, the path distance indicated in the search pattern being taken into account during the search;

A third unit for making available at least one of the information values of at least one of the triples that meets the specifications of the search pattern.

The search method can be implemented with the aid of the search device. Further advantages, also for developments of the search device, are indicated in the respectively corresponding features of the search method.

In a development of the search device, the second unit is furthermore embodied such that the triples having a path distance not exceeding the path distance, indicated in the search pattern, from the node predefined in the search pattern will be taken into account during the database search for determining the database query.

Additionally or alternatively thereto, the second unit can furthermore be embodied such that the triples having a path distance that is exactly the path distance from the node predefined in the search pattern will be taken into account during the database search for determining the database query.

In an advantageous development of the search device the second unit is furthermore embodied such that a value zero for the path distance in the search pattern can be processed in such a way that the path distance can be set to at least a maximum path distance occurring in the database.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 4 is a flowchart of the process of creating the database shown in FIG. 3;

FIG. 5 is a flowchart of the process of querying the database.

DETAILED DESCRIPTION OF THE PREFERRED EMBODIMENT like reference numerals refer to like elements throughout.

Reference will now be made in detail to the preferred embodiments, examples of which are illustrated in the accompanying drawings, wherein elements having the same function and effect are designated by the same reference characters.

FIGS. 3 and 4 show an exemplary embodiment. The intention therein within the scope of a monitoring application inside a building is to create a database for semantically annotating temporal and spatial assignments of a person to one or more rooms. FIG. 3 therein shows nodes and directed edges that are each able to accept specific information values or, as the case may be, dependencies. The following reference characters are therein employed in FIG. 3:

A: Node for information value IA=Name
B: Node for information value IB=Person
C: Node for information value IC=Position
D: Node for information value ID=Temporal
E: Node for information value IE=Spatial
F: Node for information value IF=Location
G: Node for information value IG=Name
a: Directed edge for dependency aa="has name"
b: Directed edge for dependency bb="has position"
c: Directed edge for dependency cc="has temporal position"
d: Directed edge for dependency dd="has spatial position"
e: Directed edge for dependency ee="has is located"
f: Directed edge for dependency ff="has spatial region"
g: Directed edge for dependency gg="has name"

The method of operations S1 to S5 is started at STA for creating a database DB.

Figure 1:
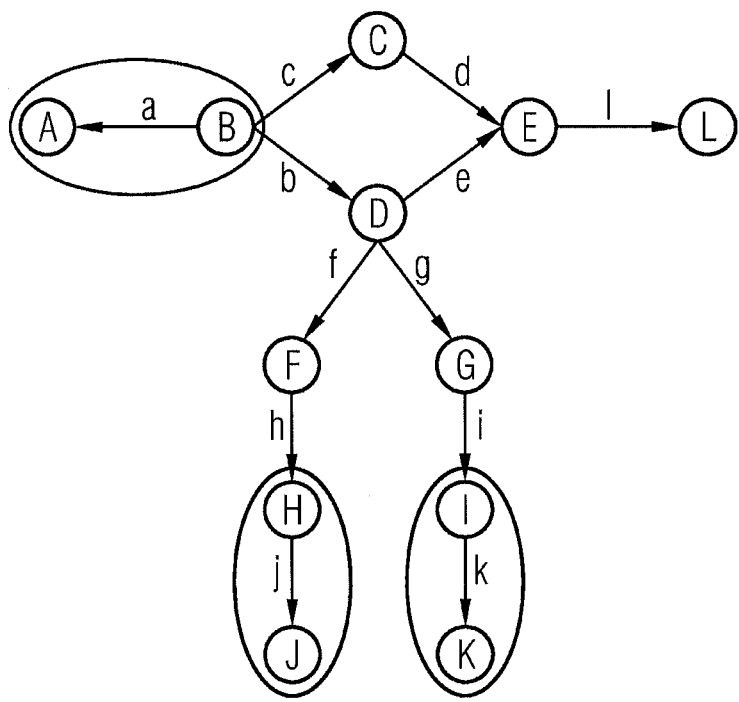
FIG. 1 is a database structure diagram having edges and nodes according to an RDF/OWL standard.
Figure 2:
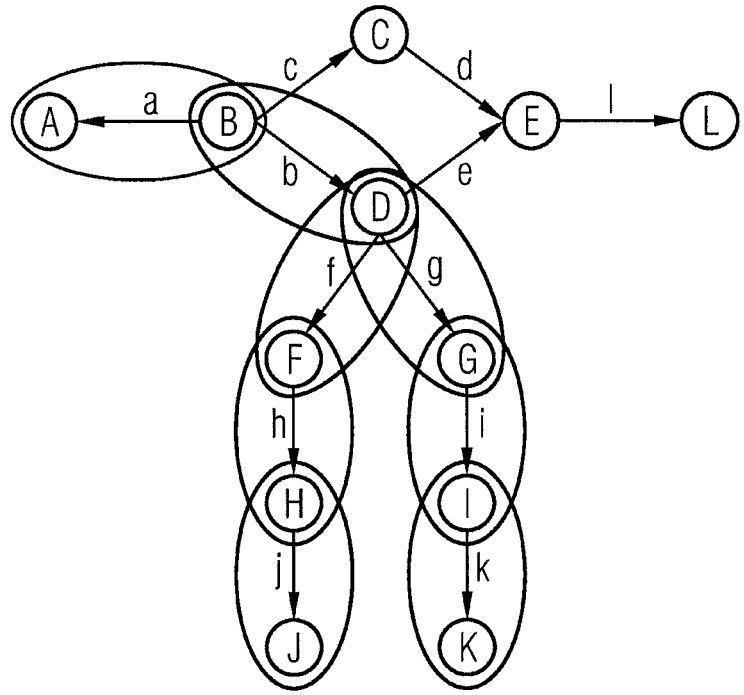
FIG. 2 is a database structure diagram of a number of RDF triples in the database that are to be taken into account during querying of three RDF triples.
Figure 3:
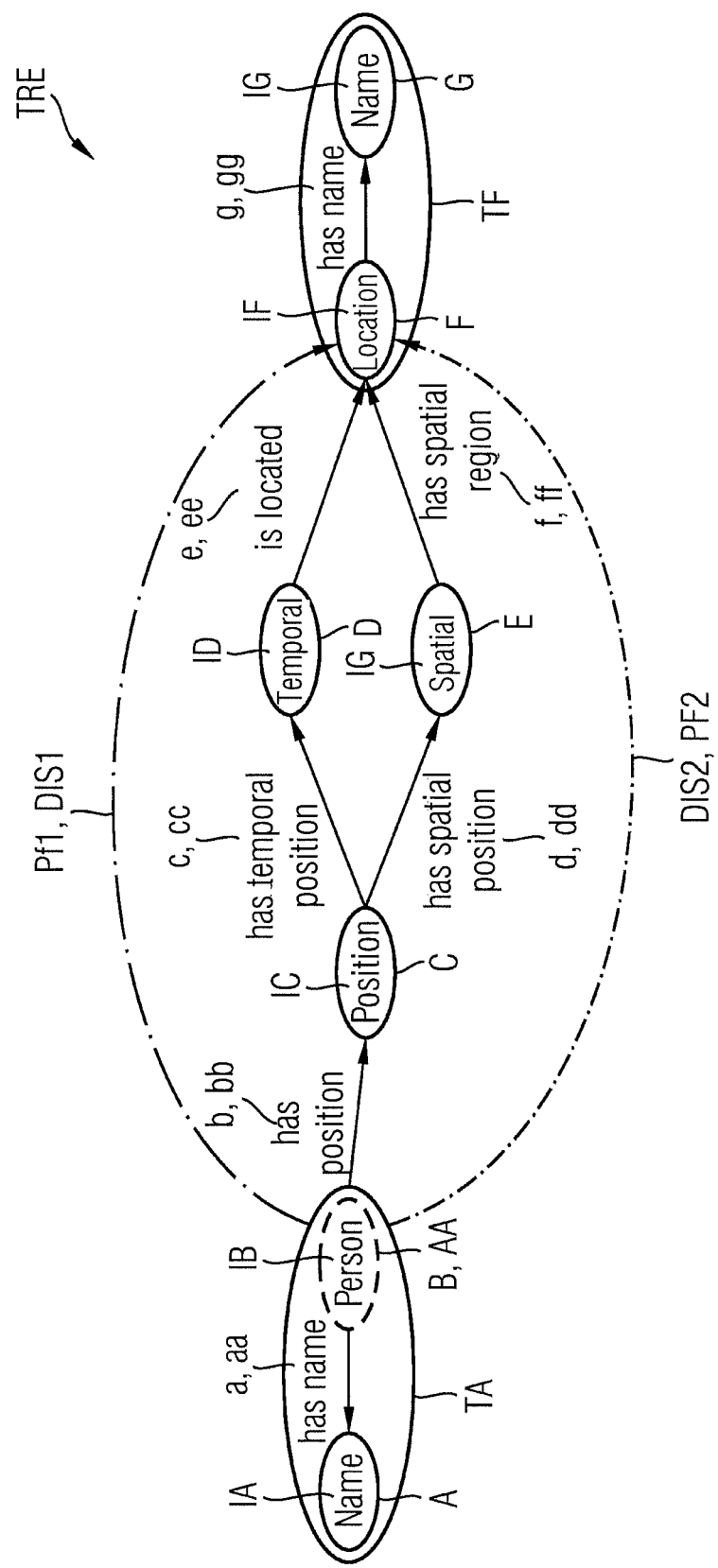
FIG. 3 a database structure diagram of a database according to an exemplary embodiment.

Read in at S1 is a description rule DEF indicating the assignment of in each case two information values IA, IB having the associated dependency aa. The description rule DEF can be embodied in the form of a sheet of paper or as an electronic file and show the respective assignments by, for example, a description language XML (XML: eXtensible Markup Language). In this example the description rule describes the assignments as shown graphically in FIG. 3.

The respective nodes A, . . . , G for the respective information value IA, . . . , IG and the respective directed edges a, . . . , g for the dependencies aa, . . . , gg are formed at S2. The edges are directed because the node at which the directed edge originates corresponds, for instance, to a subject and the node at which the directed edge terminates corresponds, for instance, to an object, the directed edge representing a semantic relationship between the two edges. Two nodes linked to a directed edge, and the associated directed edge, are designated as triple TA, TF.

Starting from a predefinable node AA=B, at S3 a directed graph TR is then formed from the nodes and directed edges based on the description rule. The predefinable node AA is from the set of nodes and serves as a starting point for a database query.

In a concrete attribute, which is to say in an individual instance, the exemplary embodiment may therein appear as follows:

Person=first person "has name" Name=Werner
Person=first person "has position" Position=15
Position=15 "has temporal position" Temporal=12:05 hrs
Position=15 "has spatial position" Spatial=48°8' NB, 11°34' ÖL (NB=Latitude North, ÖL=Longitude East)
Spatial=48°8' NB, 11°34' ÖL "has spatial region" Location=first room section
Temporal=12:05 hrs "is located" Location=first room section
Location=first room section "has name" Name=Entrance area What is here being monitored are large spaces in a plurality of locations, which is to say regions, requiring to be monitored. An instance can be created in the database each time a person enters a region. There is generally at least one concrete attribute present in the database DB.

A path PF1 is formed at S4 from the predefinable node AA to the triple TF requiring to be determined during the database query. In the present exemplary embodiment there are the following paths PF1, PF2 from the predefinable node AA to the node F in the triple TF:

PF1=AA-b-C-c-D-e-F
PF2=AA-b-C-d-E-f-F

A length of the paths, which is to say a path distance, is determined by a number of directed edges in the respective path. In the present example the path distance DIS of the path PF1 DIS1=3 and of the path PF2 DIS2=3.

At S4 it is possible in an optional extension if there are a plurality of paths to determine the shortest path which is to be used thereafter. The two paths are, however, the same length in the present example.

The path distance DIS is added to the triples TF at S5. The process in the flowchart shown in FIG. 4 is ended at END.

Also described below is a search method for determining an information value in the database DB. This query is started in the status STA according to FIG. 5.

A database query is generated at S6 by a search pattern. Instead of a predefinable path as is the case in the related art with the query language SPARQL, what is herein described as the search pattern QY during the database query is the predefinable node, which is to say the associated information value, the distance to be taken into account in the search, and the triple requiring to be determined, such as, for example:

QY="(Person) [3] (Location "has name" Name)"

This means that, as shown at S7, the triple (Location "has name" Name) is searched starting from the information value (Person) having a path distance of 3. Hence only the triples having a path distance of three will be taken into account during the search. The path distance is generally taken into account during the database search. The search method can furthermore determine the path that is least complex for the search.

At least the one information value of the triple determined by the search is output at S8 as the search result. Other information values of the determined triple and/or the dependency can furthermore also be shown.

Moreover, special value attributes for at least one of the elements of the triple can be queried in the search pattern. The search pattern QY will hence appear as follows, for example:

QY="(Person) [3] (Location "has name" Name="Entrance area")"

The locations in the database that have "Entrance area" as the specific value attribute of the name will therein be searched in the database.

The triples having the path distance that is exactly or does not exceed the path distance DIST, indicated in the search pattern, from the predefinable node AA indicated in the search pattern can furthermore be taken into account during the database search. The search method can furthermore be notified with the aid of a value zero in the path distance DIST=0 indicated in the search pattern that all the nodes in the database are to be searched.

The process in the flowchart shown in FIG. 5 is ended at END.

In the related art, the triples of the individual types can be stored using tables. Tables that are involved have to be linked together when search patterns, meaning predefinable paths, are evaluated. The efficiency of the search depends substantially on the size of the tables and on the respective selectivity.

In an implementation, a search can by contrast be limited to the path requiring few computations. This can then be the path that is the shortest, meaning the one having the smallest path distance. In this case fewer triples will have to be processed to reach the triple TF requiring to be determined from the predefinable node. It can furthermore be of advantage that the path having as small as possible tables will be selected when the triples are processed using tables. In the present example shown in FIG. 3, for instance, one table is created for the node D and another table for the node E. The table for the node D has a large number of entries and the table for the node E only a relatively small number of entries. When tables are used for realizing the database it is therefore expedient to select the path PF2 which passes through the node E and does not include the node D. Computational complexity will be reduced thereby.

The search pattern, which is to say the predefinable path, has to be indicated in full for a query according to the related art by SPARQL. In this case it is not possible to select paths leading from the predefinable node to the triple TF requiring to be determined. So what is made possible by the method is for the search pattern to have only the elements that are essential for the search and for the search method to be able to determine the optimum path for evaluating the search on the basis of the search pattern.

Another advantage can be seen in being able to set a degree of detailing during the database query by indicating the distance in the search pattern. The greater the distance is from the predefinable node, the more detailed will be the degree of information. Thus a quality of the triple TF requiring to be determined can also be indicated during the database query.

It is possible in an extension for a value zero for the path distance to indicate that the search is to be performed without limitations with respect to distance. This is advantageous as it opens the possibility of taking all the triples into account during the database query regardless of the power of the database, which is to say without knowing the maximum path distance occurring in the database.

The method for generating the database can be executed with the aid of five units M1, M2, M3, M4, M5 using the device VOR. The search method for determining an information value in the database can furthermore be realized by the units E1, E2, and E4 using the search device SVOR. The units can be implemented in hardware or software form or as a combination of hardware and software. The units can also be implemented using a computer unit.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A search method for determining an information value in a database, the database being generated by reading a description rule indicating assignment of two information values having an associated dependency, creating a respective node for each information value and a respective directed edge for the associated dependency, generating a directed graph starting from a predefinable node from among the nodes, based on the description rule, with the respective nodes and the respective directed edge linking the respective nodes characterized as a triple, determining at least one path from the predefinable node to the triple required to be determined in a database query, and generating a respective path distance of each path determined, the respective path distance indicating a number of directed edges from the predefinable node to the triple required to be determined, where the respective path distance can be evaluated during the database query starting from the predefinable node, the search method comprising:
   generating the database query by a search pattern including an indication of the predefinable node, the triple required to be determined and the respective path distance;
   searching the database based on the database query and the respective path distance indicated in the search pattern; and
   making available at least one information value of at least one located triple found by said searching.

2. The search method as claimed in claim 1, wherein said searching considers only triples having a corresponding path distance not exceeding the respective path distance from the predefinable node indicated in the search pattern.

3. The search method as claimed in claim 2, wherein said searching begins with the triples for which the corresponding path distance is equal to the respective path distance from the predefinable node indicated in the search pattern.

4. The search method as claimed in claim 3, wherein when the respective path distance indicated by the search pattern is equal to zero, said searching uses as the respective path distance a maximum path distance occurring in the database.

5. The search method as claimed in claim 2, wherein when the respective path distance indicated by the search pattern is equal to zero, said searching uses as the respective path distance a maximum path distance occurring in the database.

6. The search method as claimed in claim 1, wherein said searching considers only triples having a corresponding path distance equal to the respective path distance from the predefinable node indicated in the search pattern.

7. The search method as claimed in claim 1, wherein when the respective path distance indicated by the search pattern is equal to zero, said searching uses as the respective path distance a maximum path distance occurring in the database.

8. A search device for determining an information value in a database, the database having been generated by reading a description rule indicating assignment of two information values having an associated dependency, creating a respective node for each information value and a respective directed edge for the associated dependency, generating a directed graph starting from a predefinable node from among the nodes, based on the description rule, with the respective nodes and the respective directed edge linking the respective nodes characterized as a triple, determining at least one path from the predefinable node to the triple required to be determined in a database query, and generating a respective path distance of each path determined, the respective path distance indicating a number of directed edges from the predefinable node to the triple required to be determined, where the respective path distance can be evaluated during the database query starting from the predefinable node, the search device comprising:
   one or more processors configured to:
   generate the database query by a search pattern including an indication of the predefinable node, the triple required to be determined and the respective path distance;
   search the database based on the database query and the respective path distance indicated in the search pattern; and
   make available at least one information value of at least one located triple found by said search unit.

9. The search device as claimed in claim 8, wherein said search considers only triples having a corresponding path distance not exceeding the respective path distance from the predefinable node indicated in the search pattern.

10. The search device as claimed in claim 9, wherein said search begins searching with the triples for which the corresponding path distance is equal to the respective path distance from the predefinable node indicated in the search pattern.

11. The search device as claimed in claim 10, wherein when the respective path distance indicated by the search pattern is equal to zero, said search uses as the respective path distance a maximum path distance occurring in the database.

12. The search device as claimed in claim 9, wherein when the respective path distance indicated by the search pattern is equal to zero, said search uses as the respective path distance a maximum path distance occurring in the database.

13. The search device as claimed in claim 8, wherein said search considers only triples having a corresponding path distance equal to the respective path distance from the predefinable node indicated in the search pattern.

14. The search device as claimed in claim 8, wherein when the respective path distance indicated by the search pattern is equal to zero, said search uses as the respective path distance a maximum path distance occurring in the database.

* * * * *